US005560976A

United States Patent [19]

Huang

[11] Patent Number: 5,560,976
[45] Date of Patent: Oct. 1, 1996

[54] DUAL CELL HONEYCOMB STRUCTURE

[75] Inventor: Chung-Chen Huang, Taipei, Taiwan

[73] Assignee: Teh Yor Industrial Co., Ltd., Taipei, Taiwan

[21] Appl. No.: 346,045

[22] Filed: Nov. 29, 1994

[51] Int. Cl.$^{6}$ .................................................... B32B 3/12
[52] U.S. Cl. ...................... 428/118; 52/793.1; 160/84.05
[58] Field of Search .................................... 428/116, 118; 160/84.01, 84.05; 52/793.1

[56] References Cited

U.S. PATENT DOCUMENTS

| | | | |
|---|---|---|---|
| 4,307,768 | 12/1981 | Anderson | 428/116 X |
| 4,450,027 | 5/1984 | Colson | 428/188 X |
| 4,603,072 | 7/1986 | Colson | 428/116 |
| 4,631,108 | 12/1986 | Colson | 156/461 |
| 4,631,217 | 12/1986 | Anderson | 428/118 |
| 4,677,012 | 6/1987 | Anderson | 428/116 |
| 4,685,986 | 8/1987 | Anderson | 428/116 X |
| 4,984,617 | 1/1991 | Corey | 160/89 X |
| B1 4,603,072 | 7/1991 | Colson | 428/116 |

*Primary Examiner*—Henry F. Epstein
*Attorney, Agent, or Firm*—Pro-Techtor International

[57] ABSTRACT

A honeycomb structure consists of a plurality of dual cell members, each of these members is formed of a continuous length of foldable material which is folded into a 8-figured configuration. The dual cell members are stacked and adhered superposedly to constitute a window covering and the like.

4 Claims, 2 Drawing Sheets

DUAL CELL HONEYCOMB STRUCTURE

FIELD OF THE INVENTION

This invention relates to a novel expandable honeycomb structure consisting of a plurality of dual cell members, particulary, to said expandable honeycomb structure, in which each of those dual cell members is formed of a continuous length of foldable material which is folded into a 8 -figured configuration.

BACKGROUND OF THE INVENTION

Various honeycomb structures made of foldable material are disclosed in the prior art. For example, U.S. Pat. Nos. 4,450,027; 4,603,072 and 4,631,108 to Colson disclose a honeycomb structure constructed by folding a continuous length of foldable material at diametrically opposite sides partially over itself into a tubular form as an individual cell. In addition, U.S. Pat. No. 4,677,012 to Anderson discloses a honeycomb structure formed of a continuous length of foldable material having its longitudinal edges folded over one side of the material and secured to a separate strip material. In this patent the cells are also formed one by one and an additional strip material is required. Another U.S. Pat. No. 4,631,217 to Anderson discloses a honeycomb structure formed of a continuous length of foldable material which is folded into a Z-configuration. In this patent each cell is constituted at front face by a piece of material and at rear face by another piece of material, in which each piece of material is extended from one cell to adjacent cell. Anyway, individual cell is formed by each one half of two pieces of material.

The inventor of the present application found that these honeycomb structures disclosed in afore-mentioned prior art can be manufactured only at a lower productivity since the production rate cannot be speedup due to the unit cell is made individually, and thus the quality of the products is relatively not easy to control uniformly.

SUMMARY OF THE INVENTION

Therefore, the object of this invention is to provide a dual cell honeycomb structure to increase the productiveity since dual cell is formed at one time and thus the quality of products is more readily to contral.

The object of this invention is accomplished by providing a novel expandable honeycomb structure consisting of a plurality of dual cell members, each of these members is formed of a continuous length of foldable material which is folded into a 8-figured configuration.

Another object of this invention is to provide a window covering constructed by staking any desirable number of present dual cell members and adhered to each other superposedly.

Afore-mentioned and other objects, features and advantages will be beter understood from the following description in detail with reference to the embodiments as illustrated in the accompanying drawings. Of course, the embodiments are for illustrative purposes and are by no means to restrict this invention.

DETAILED DESCRIPTION OF THE PREFERRED EMBODIMENTS

Figure 1:
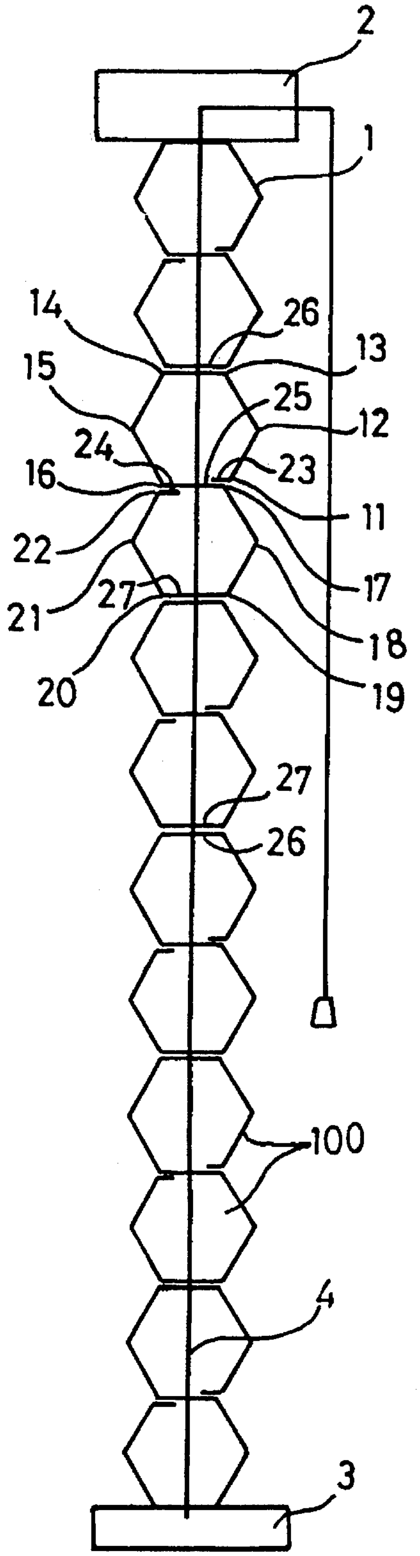
FIG. 1 is a schemative elevational end view of the honeycomb structure according to the present invention, in its expanded state.

As shown in FIG. 1, the expandable honeycomb structure of the present application consists of a plurality of dual cell members 1. The structure is termed "dual cell" due to the fact that the cell members 1 are formed in sets of two cells. Each set of two cells is formed from a single piece of material. The number of said dual cell members 1 in one structure may be varied and depends on the overall dimensions of the honeycomb structure in expanded state required for a window. Each member 1 is formed of a continuous length of foldable material, such as fibrous material, e.g. papers, textile fabrics and the like. The material is longitudinally folded so that the cross section of the resulting dual honeycomb structure is two polygonal shaped cells, one above the other, and to set permanently a plurality of creases, namely twelve creases in the embodiment, as shown at 11, 12, 13, 14, 15, 16, 17, 18, 19, 20, 21 and 22 resulting eleven sections in total defined between respective adjacent creases. So that a common intermediate section 25 is defined between the creased 16 and 17, a top section 26 is defined between the creases 13 and 14, and a bottom section 27 is defined between the creases 19 and 20. Two longitudinal edges 23, 24 of the material outside of the creases 11 and 22 at terminal ends are deflected inwards in opposite directions. One of said longitudinal edge 23 is glued on one side of said intermediate section 25 while another edge 24 is 1 glued on opposite side of said section 25. As shown, each dual cell member 1 consists of two halves, in up-side-down symmetrical relationship to each other.

The predetermined number of dual cell members 1 is stacked one on the top of other and adhered to each other superposedly, by glueing the top section 26 of one member 1 to the bottom section 27 of one adjacent overlying member 1 and meanwhile the bottom section 27 of said member 1 to the top section 26 of another adjacent underlying member 1. But the top section 26 of the uppermost member 1 is connected to a top rail 2 while the bottom section 27 of the lowermost member 1 is connected to a bottom rail 3. A cord 4 is passed through the substantial centers of all dual cell members 1 and terminally connected to said bottom rail 3.

Figure 2:
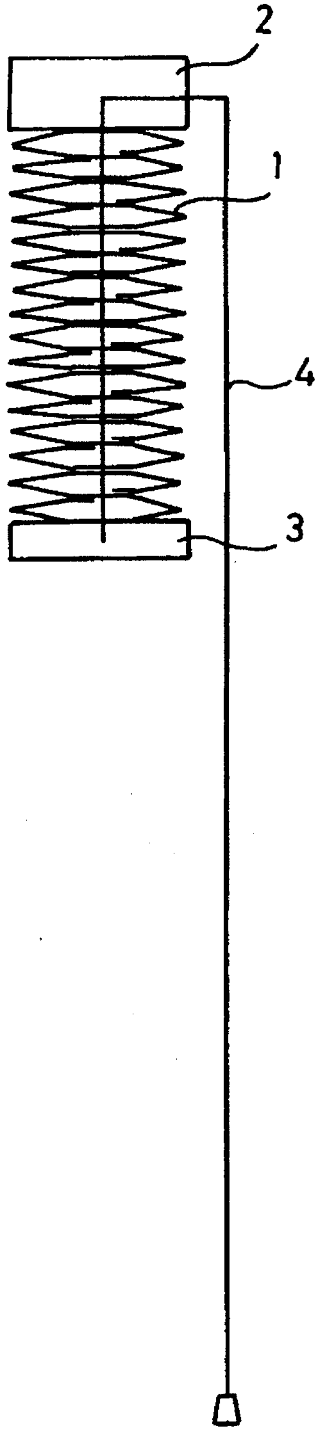
FIG. 2 is similar to FIG. 1 but illustrated in its contracted state.
Figure 3:
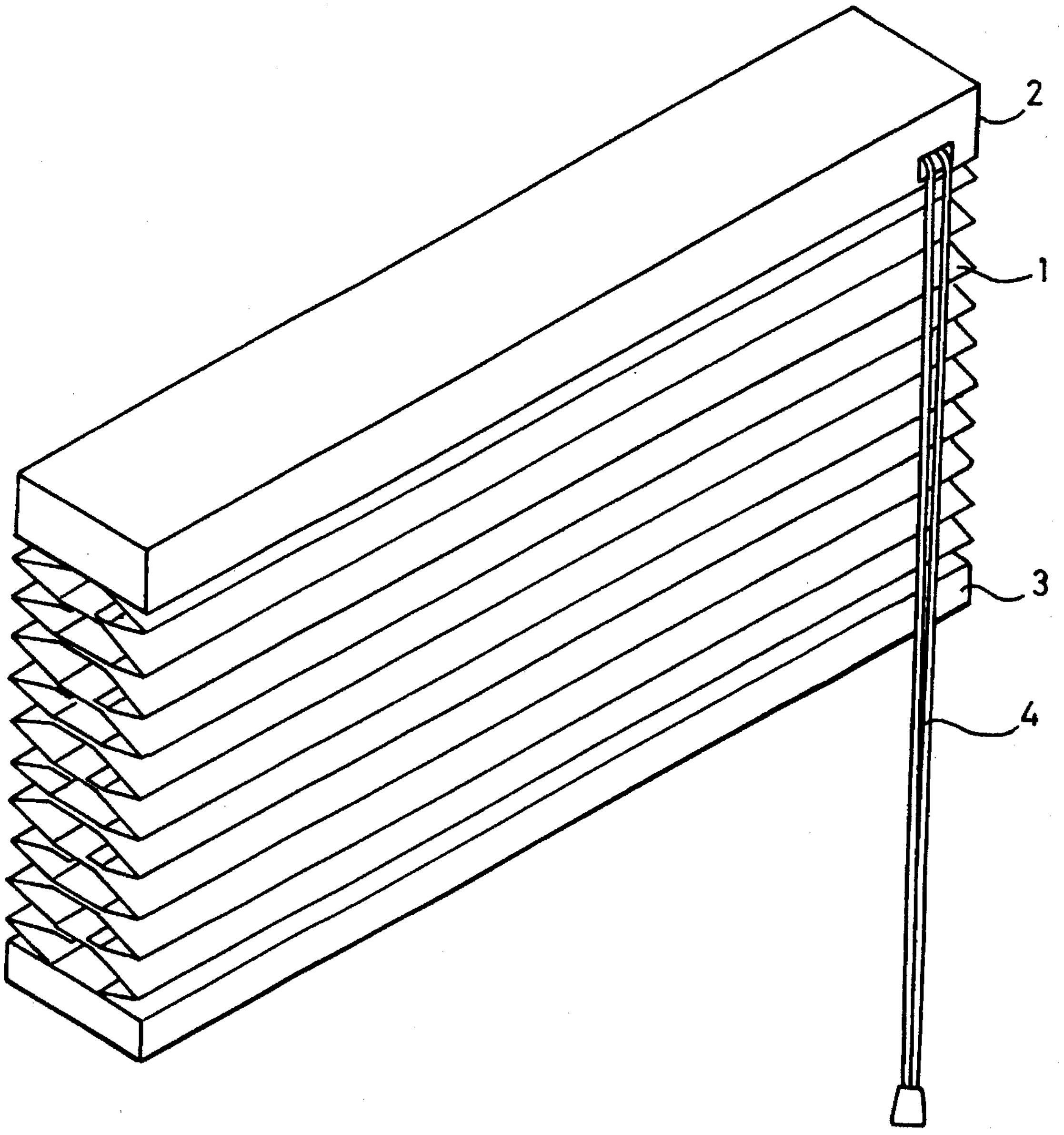
FIG. 3 is a perspective view corresponding to FIG. 2.

In use, the present dual cell honeycomb structure in expanded state has advantageous characteristics of excellent thermal insulation against heat or cold and good ability of sunlight shielding. On the contrary, the present honeycomb structure can be contracted through the raising of the bottom rail 3 by pulling down the cord 4, so that the dual cell members 1 are collapsed in standby, as shown in FIGS. 2 and 3.

As used herein, "honeycomb" is broadly defined to indicate general connected cells, but not necessary in hexagonal as described and shown.

The dual cell honeycomb structure according to the presently preferable embodiments has been described hereinabove as exemplary of the invention. Moreover, it should be noted that a number of modifications, variations and changes can be made to the invention without departing from the spirit and scope thereof. Accordingly, the invention is not intended to restrict in the forgoing embodoments, but is only limited by the scope of the appended claims.

What I claim is:

1. An expandable honeycomb structure comprising:

a plurality of dual cell members affixed together, each said dual cell member being formed from a single length of foldable material, said material being folded so that a first polygonal cell and a second polygonal cell are formed from said single length of foldable material, said first and said second polygonal cells being aligned vertically, said material including a plurality of longitudinal folds forming said first polygonal cell, a first free end of said material being affixed at a first end of a lower side of said first polygonal cell, so that said first cell is formed as a closed polygonal cell, a remaining half of said material including a further plurality of folds to form the second polygonal cell, a second free end of said material being affixed to a second end of said lower side of said first polygonal cell, said second polygonal cell being integral to said first polygonal cell, and being formed from said single length of material.

2. The expandable honeycomb structure of claim 1 wherein:

said first polygonal cell and said second polygonal cell are hexagons.

3. The expandable honeycomb structure of claim 2 wherein:

a top section of an uppermost cell member is connected to a top rail, and a bottom section of a lowermost cell member is connected to a bottom rail.

4. The expandable honeycomb structure of claim 1 wherein:

a top section of an uppermost cell member is connected to a top rail, and a bottom section of a lowermost cell member is connected to a bottom rail.

* * * * *